US012691654B2

(12) United States Patent
Carboni et al.

(10) Patent No.: US 12,691,654 B2
(45) Date of Patent: Jul. 28, 2026

(54) RETENTION DEVICE FOR RETAINING A BLANK, MOVEMENT UNIT AND PROCESS FOR MOVING SAID BLANK

(71) Applicant: G.D S.P.A., Bologna (IT)

(72) Inventors: Salvatore Carboni, Bologna (IT); Antonio Vitali, Bologna (IT)

(73) Assignee: G.D S.P.A., Bologna (IT)

( * ) Notice: Subject to any disclaimer, the term of this patent is extended or adjusted under 35 U.S.C. 154(b) by 786 days.

(21) Appl. No.: 17/998,016

(22) PCT Filed: Jul. 5, 2021

(86) PCT No.: PCT/IB2021/055994
§ 371 (c)(1),
(2) Date: Nov. 4, 2022

(87) PCT Pub. No.: WO2022/009059
PCT Pub. Date: Jan. 13, 2022

(65) Prior Publication Data
US 2023/0173780 A1 Jun. 8, 2023

(30) Foreign Application Priority Data
Jul. 9, 2020 (IT) ........................ 102020000016702

(51) Int. Cl.
*B31B 50/00* (2017.01)
*B25J 9/10* (2006.01)
(Continued)

(52) U.S. Cl.
CPC ........... *B31B 50/024* (2017.08); *B25J 9/1065* (2013.01); *B31B 50/06* (2017.08); *B31B 50/07* (2017.08)

(58) Field of Classification Search
CPC .............. B31B 50/804; B31B 2120/30; B31B 2100/00; B31B 50/80; B31B 2100/0022;
(Continued)

(56) References Cited

U.S. PATENT DOCUMENTS 5,176,612 A * 1/1993 Calvert ................ B65H 3/0883
493/317
5,234,314 A * 8/1993 Ganz .................... B65H 3/0808
414/797
(Continued)

FOREIGN PATENT DOCUMENTS

EP 2149521 A1 2/2010
EP 3392170 A1 10/2018
(Continued)

OTHER PUBLICATIONS

International Search Report and Written Opinion for International PCT Application No. PCT/IB2021/055994 filed on Jul. 5, 2021, on behalf of GD SPA. Mailed on Oct. 5, 2021. 10 Pages.

*Primary Examiner* — Jacob A Smith
(74) *Attorney, Agent, or Firm* — Steinfl + Bruno LLP

(57) ABSTRACT

A retention device for retaining blanks includes: a support, a first gripping portion secured to the support and provided with first retention elements of a blank, a second gripping portion secured to the support or to the first gripping portion and provided with second retention elements of the blank, and a movement mechanism for the second gripping portion with respect to the first gripping portion. The movement mechanism is configured to perform a pure rotation of the second gripping portion about a virtual rotation axis defined outside the retention device.

16 Claims, 12 Drawing Sheets

(51) Int. Cl.
    B31B 50/02       (2017.01)
    B31B 50/06       (2017.01)
    B31B 50/07       (2017.01)

(58) Field of Classification Search
    CPC ..... B31B 50/06; B65B 43/265; B65B 43/185;
                         B65B 43/35; B65B 5/024
    USPC .......... 493/309, 316, 313, 315, 318; 53/566,
                                 53/564, 282, 381.1, 456
    See application file for complete search history.

(56)                References Cited

U.S. PATENT DOCUMENTS 8,277,367 B2    10/2012  Jannin et al.
9,284,076 B2 *   3/2016  Monti ................... B65B 43/285
11,220,408 B2    1/2022  Persson

FOREIGN PATENT DOCUMENTS

FR          3034404 A1   10/2016
WO     2008/047008 A1    4/2008

* cited by examiner

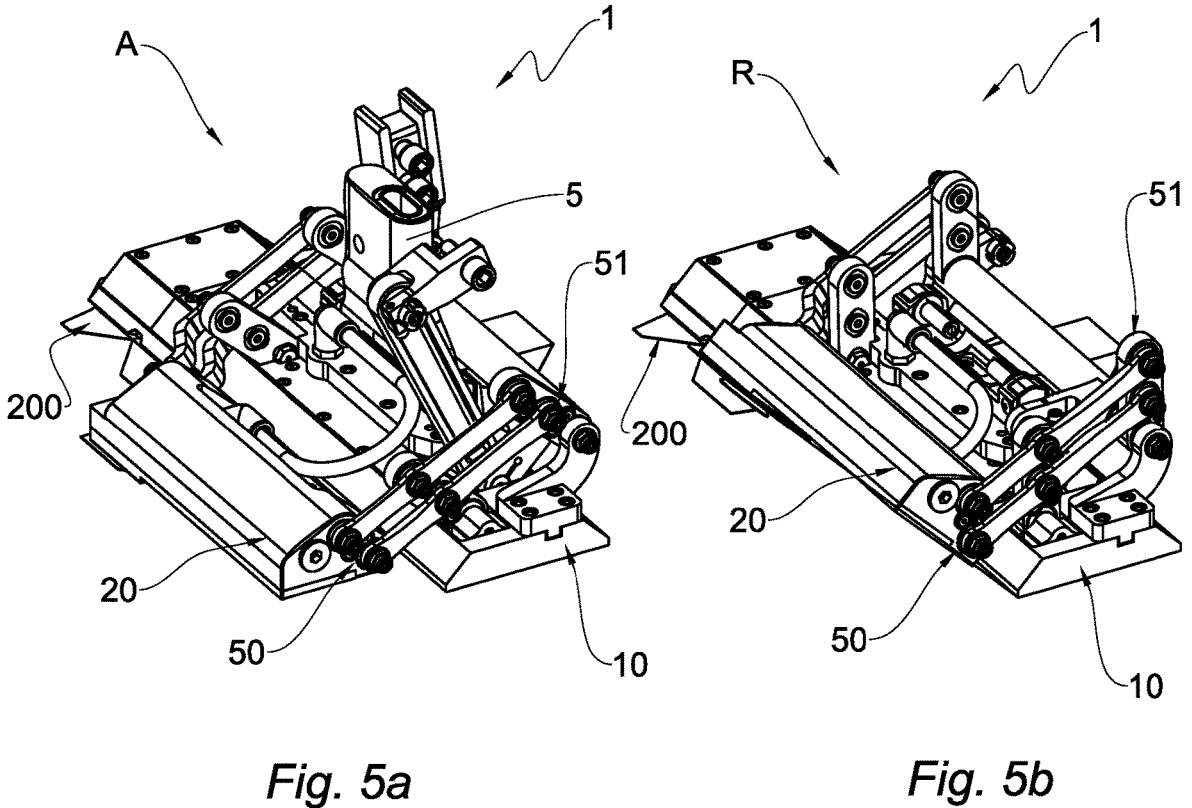
*Fig. 5a*                      *Fig. 5b*

RETENTION DEVICE FOR RETAINING A BLANK, MOVEMENT UNIT AND PROCESS FOR MOVING SAID BLANK

CROSS REFERENCE TO RELATED APPLICATIONS

The present application is the US National Stage of International Patent Application No. PCT/IB2021/055994, filed on Jul. 5, 2021, which in turn, claims priority to Italian Application No. IT 102020000016702, filed on Jul. 9, 2020.

The present invention relates to a retention device for retaining a blank, a movement unit for moving said blank as well as a process for moving the blank.

In particular, the retained and possibly moved blank is configured to be used as a container for packing loose articles.

The present invention finds a preferred, although not exclusive, application in the field of packing loose articles in containers such as, for example, capsules of products by infusion, for example coffee, a sector to which reference can be made hereinafter without losing generality.

A retention device generally comprises devices suitable for securing some parts of the object of interest.

Typically, the containers pertaining to this technical field are produced by the packing apparatus from a semi-finished product of convenient shape according to the desired manufacturing processes and for which it is intended.

In a known process type, the semi-finished products used have four lateral surfaces which are secured to each other by means of folding creased portion to form a continuous lateral body closed on itself, as well as a bottom surface and an upper surface which are secured to said lateral body with possibility to rotate.

In this manner, it is possible to shape the aforesaid semi-finished products from a substantially planar configuration, in which the lateral surfaces are laid on two adjacent layers and two by two coplanar, to an open configuration, in which the adjacent lateral surfaces are substantially perpendicular to each other, by means of a simple rotation of a lateral surface with respect to another surface which is adjacent thereto.

However, this simple operation of controlled deformation of the semi-finished product during the processing steps of a container actually requires a preliminary processing step.

This results from the fact that the semi-finished product is typically obtained from a blank.

The blanks generally have a substantially planar shape in order to facilitate the transport and the storage thereof in the warehouse and are configured in such a manner as to allow the desired container to be obtained, by simply folding and fixing or gluing the various panels that make up the flat blank. This blank is typically produced from cardboard or thin cardboard with folding lines, which are made by creasing portions, which allow the container to be formed by means of folding operations folding the different portions of the blank and by their mutual fixing.

In this sense, therefore, the blank has an initial flat shape, takes on one or more spatial conformations of semi-finished blank during the various processing steps until it is completely formed into the desired final container.

Once the aforesaid box-shaped container has been made, it is possible, again thanks to devices included in the packing apparatus, to fill this container with articles or products of interest.

In this context, a process for treating a blank is called "continuous" when at each time coordinate the conveyor that moves the blank has a speed other than zero. This speed considered is the speed of the conveyor during any processing step which leads to forming a container starting from said blank with respect to a fixed reference system and is intended as the speed of the conveyor in its entirety.

In this context, the term "container" identifies a structure which is formed so to be able to contain material within it and in particular to be able to confine it at least laterally.

In context, the term "retention elements" identifies devices suitable for fixedly securing one or more portions of the blank or semi-finished product to them in such a manner that, during the retention step, at any movement of the retention element there is an equal movement of the aforesaid portion of the blank or semi-finished product retained.

In this context, a first element is defined as "engaged" with a second element when an interaction is established between the two elements such that the first element is able to determine the movement of the second element. This interaction may be, for example, of a mechanical, magnetic or other nature.

A plane is said "horizontal" when it is parallel to the plane of the ground in which the forming unit object of the invention is installed.

Consistently, the term "vertical" identifies a direction which is perpendicular to the horizontal plane and so must be understood the terms relating to "upper" or "lower" positioning which refer to an orientation along the vertical direction.

In this context, the term "pure rotation" means the rotation movement that is produced by a rigid body assuming that the rotation axis of this movement is fixed.

In other words, a movement of pure rotation is characterised in that, considering an operator of symmetry defined as a rotation axis A parallel to a vector Z of an orthogonal triad of vectors XYZ of a rigid body, this operator of symmetry moves all the points of the rigid body subjected to it by keeping them at a fixed spacing from the rotation axis A (this fixed spacing is defined as the "radius") and by modifying at each point of the circular trajectory, defined by the operator of symmetry for each point of the rigid body, the directions of the two vectors X and Y while keeping the direction of the vector Z constant.

In this same context, and for the sake of further clarity, the movement of pure translation is identified as a movement with respect to a reference point that leads to a change in the spacing of each point of the rigid body from the reference point while the directions of the three vectors XYZ do not vary.

It is therefore clear that the movement of pure rotation is different from a more complex movement such as, for example, roto-translation (which provides for the sum of at least one movement of pure rotation with at least one movement of pure translation) since not all the requirements of pure rotation are met.

In this context, by the term "virtual rotation axis" it is intended an axial operator of symmetry that does not coincide with a rotation axis of a corresponding rotating mechanical element, e.g. a pin, a shaft, a bearing, a hinge, etc. For convenience and further clarity's sake, axial symmetry operators that coincide with a rotation axis of a corresponding mechanical element will in this context be identified as "real rotation axes".

The terms "damaging", "damage" or "to damage" refer to the increase in the zo density of plastic component deformations (i.e. plastic and/or elastic-plastic deformations), and thus of the structural defects, in a surrounding of the material to be treated.

Such damages are considered excessive and therefore not acceptable when they compromise the processability and/or the use of the material according to its desired intended use. Cases of unacceptable damage mentioned purely by way of non-limiting example can be: impairment of the structural consistency of the material with excessive reduction or increase in the elastic modulus, formation of extensive surface or internal cracks, variations in surface roughness that make it difficult to have a good flat abutment surface to retain and move the material during the processing steps, anaesthetic variations in the surfaces to be exposed, etc.

This increase in the density of deformations with plastic component of the material is correlated to the relative movements of the various portions of the material being deformed and according to which the most appropriate surroundings are considered.

In this sense, a flexion of a material about one of the points thereof leads to a compression zone and a traction zone in the section thereof, and therefore a limited increase in deformation density which is substantially contained at the rotation axis of the flexion itself. In this respect, a traction or a compression substantially entails a uniform variation of the whole section, also in this case increasing the density of deformations. It is thus clear that a translation added to a rotation at one point induces more damages in the material than a simple rotation applied at the same point.

The Applicant has observed that the processes generally implemented by packaging apparatuses that operate on semi-finished products provides for them being placed on an initial hopper in a planar configuration. The great advantage of using such a formed semi-finished product therefore provides for obtaining the open configuration through very simple and rapid operations that are well suited to the industrial production need.

At the same time, however, the Applicant has ascertained that this method therefore requires a different initial forming apparatus, acting upstream of the packing apparatus using the semi-finished product, the forming apparatus transforms the open planar blank into the semi-finished product with the desired closed lateral body.

The Applicant has also noted that these operations are generally carried out using different apparatuses as they involve complex and diverse retention, movement, folding and fixing systems that may be bulky or unnecessary in the following steps of forming the container.

In fact, the Applicant has ascertained that the blanks have various difficulties in being moved, due to their open planar development (thus void of closed structures that are secured on themselves) which can in some cases act as a "sail" with respect to the relative air flows produced during the aforesaid movements thus generating undesirable slowdowns or modifications of the programmed forming processes.

For this reason, the industry of the field has generally opted to form the container using devices that start this process from the semi-finished product with closed lateral body, which therefore presents considerably fewer movement difficulties than the open blank precisely due to its reduced degrees of freedom of movement during the movements.

Even more, the Applicant has noted that if an attempt were to be made to carry out a forming process from an open flat blank, such a condition would require retaining several portions of the blank while at the same time allowing for desired and necessary movements of the different portions in order to optimally manage the various movements required.

Furthermore, the Applicant has noted that too many retention constraints risk making the retention devices excessively bulky, rigid and heavy, thus compromising the maximum movement speed thereof and therefore the maximum speed of the movements of the blank and, consequently, the productivity of the process itself.

Furthermore, the Applicant has noted that the use of the retention devices known in the state of the art when applied to the blanks tend to produce local deformations and damages on the blank due to internal compressions and/or tractions induced by the devices during the processing steps.

The Applicant has therefore perceived that it was advantageous to start the process of forming the container directly from the blank and that in order to do so it was necessary to develop a retention device of the blank that was completely different from the prior art and more adaptable to the features of the blank.

Thanks to this approach, the Applicant has verified that it is possible to manage the various movement steps during the forming process more efficiently, since the division between the step of making the semi-finished product from a blank and the step of moving the semi-finished product to form the final container is waived, thus creating a movement and a processing flow that are single uninterrupted and joint.

The Applicant has finally found that the desired optimization of the above-mentioned processes is achieved by realizing a retention device for retaining a blank comprising a first and a second gripping portion which are provided with respective retention elements capable of simultaneously retaining different parts of the blank, wherein the second gripping portion is rotated with respect to the first gripping portion about a virtual rotation axis, external to the retention device.

In this way it is possible to mutually move the parts of the blank adhering to the first and second gripping portion, minimising local deformations of the blank due to compressions or tractions thereof.

It is significant to note that the logic of the process is very different from that adopted in the prior art with regard to the concept of "controlled retention and movement": in fact, thanks to this invention, it is overcome the condition whereby a process of forming is to be started by retaining a semi-finished product (previously formed from a blank), starting instead directly from a blank and at the same time being able to move it, minimizing the damages that can be caused.

In particular, in a first aspect thereof, the invention relates to a retention device for retaining a blank comprising a support.

Preferably, the retention device comprises a first gripping portion which is secured to said support and which is provided with first retention elements for retaining said blank.

Preferably, the retention device comprises a second gripping portion which is secured to said support to said support or to said first gripping portion and which is provided with second retention elements for retaining said blank.

Preferably, the retention device comprises a movement mechanism for moving said second gripping portion with respect to said first gripping portion, which movement mechanism is configured to carry out a pure rotation of said second gripping portion about a virtual rotation axis which is located outside said retention device.

Thanks to these characteristics, it is possible to retain and move the second gripping portion with respect to the first gripping portion of the blank in such a manner that the axis of pure rotation is not located in the retention device. It is therefore possible to overcome the rotation limitations introduced by the overall steric sizes of the kinematic mechanisms which are rotating about a real rotation axis of the device, thus giving the blank the possibility to flex and deform in a freer manner, thus better following its internal structural requirements and therefore being subjected to less damages.

This is advantageous, for example, if it is wished to bring the blank to a certain configuration by folding one part with respect to another, or also to carry out a step of pre-folding of a part of the blank, which ensures that this folded part is already locally deformed and therefore shows less rigidity during a subsequent folding. This facilitates and improves the following forming steps. More in detail, as can be deduced from what has been pointed out so far, pre-folding finds advantageous application in particular for blanks of larger dimensions (i.e., as the dimension of the blank increases, the benefit that can be obtained with the pre-folding step increases).

In a second aspect thereof, the invention relates to a movement unit for moving blanks comprising a retention device made according to the preceding aspect.

Preferably, the movement unit for moving the blanks comprises a drum to which said retention device is secured.

In this sense, such drum acts as a conveyor for said retention device and therefore for said blank retained thereon.

Thanks to this solution, it is possible to move the blank quickly by rotating the drum and effectively bringing the blank into the desired position.

Furthermore, this mode identifies an ideal solution if the retention device must remove the blank from a hopper with horizontal orientation and then move it up to a horizontal or vertical conveyor belt.

Horizontal hoppers are in fact practical and easy to use, as they allow loading easily and efficiently in line the blanks to be treated, also avoiding crushing the blanks under their own weight as occurs in vertical hoppers.

The horizontal hoppers prepare the blank ready for the removal oriented according to a vertical plane. This orientation is not easy to use if the retention device of the blank is mounted on a conveyor belt since it would be necessary to make a belt that moves vertically and this operating mode is disadvantageous with respect to the force of gravity.

Furthermore, if the blank were to be released in a horizontal direction (very practical and advantageous for the forming processes), it would be necessary to rotate the advance direction of the conveyor belt through ninety degrees, which would take away useful space for any further components and make the path of the blank more complex and tortuous.

On the contrary, the solution realised according to the second aspect of the present invention allows to easily approach the blank held by the horizontal hopper and to effectively remove it by moving it according to desire until releasing it to a further retention device having for example a horizontal orientation. It is immediately clear that by rotating the drum it is possible to change the orientation of the blank in order to transfer it promptly to the desired additional retention device.

In a third aspect thereof, the invention relates to a process for moving a blank comprising the step of providing a movement unit made in accordance with the second aspect of the present invention.

Preferably, the process comprises the step of bringing a drum included in said movement unit to a removal position in which a retention device made according to the first aspect of the present invention included in said movement unit faces a blank.

Preferably, the process comprises the step of activating retention elements of said retention device by securing said blank to said retention device.

Preferably, the process comprises the step of rotating said drum in a direction from said removal position as far as a release position.

Preferably, the process comprises the step of rotating a second gripping portion of said retention device with respect to a first gripping portion of said retention device about a virtual rotation axis which is located outside said retention device, while said drum rotates between said removal position and said release position.

Preferably, the process comprises the step of deactivating said retention elements by disengaging said blank from said retention device while said drum is in said release position.

In this way it is possible to remove, move and release a blank being able to change the configuration of the blank while causing low and limited material deformation.

Furthermore, this solution allows the blank to be transported by reducing the sail effect during rotation, thereby optimising the effect of the retention elements and ensuring an effective and continuous grip. In fact, when the second gripping portion is rotated in the direction tangential to the radius of the drum, the second gripping is able to offer a smaller surface area to the air flow produced during the rotation and thus improve the effect produced by the retention elements.

Furthermore, the overall sizes of the blank and of the retention device can be controlled more freely during the rotation of the drum, thus reducing the possibility of collisions with fixed or moving parts outside the retention device.

In a fourth aspect thereof, the invention further relates to a packing apparatus for packing articles comprising at least one movement unit for moving blanks which is constructed in accordance with the aforesaid second aspect.

In at least one of the above-mentioned aspects, the present invention may further have at least one of the preferred features described below.

Preferably, said first and second retention elements are selectively connectable to a pressure reduction circuit.

Thanks to this solution, it is possible to construct retention systems simply, economically and effectively.

Preferably, said retention elements are suction cups or other pneumatic means.

Thanks to this solution, it is possible to firmly retain surfaces of the blank fixedly with the retention device during all the desired movements.

Preferably, said movement mechanism is configured to move in roto-translation said second gripping portion with respect to said first gripping portion.

In this way it is possible to realise an efficient articulated movement system that is able to modify the resulting real rotation radius of the second gripping portion with respect to the first gripping portion thanks to a translation in such a manner that the resultant is a pure rotation with respect to the virtual rotation axis.

In fact, thanks to this technical solution it is possible to correct the deformations of a translational nature that the second gripping portion by moving with respect to the first gripping portion would induce in the material of the blank.

In other words, considering that, in this case, the pure rotation, and therefore the rotation with constant radius, is by definition only possible about the virtual rotation axis (which does not correspond to a real rotation axis of a rotating element), one way of physically realising this specific type of movement is to correct the rotations on a real radius (different from the virtual rotation axis) while at the same time moving in translation the second gripping portion with respect to the first one.

Preferably, said movement mechanism comprises an articulated parallelogram which is secured to said first gripping portion and said second gripping portion.

In this way, it is possible to move in roto-translation said second gripping portion with respect to said first gripping portion, thus reducing the damages produced in the material of the blank during movement.

Preferably, said articulated parallelogram comprises a first rod which is secured by means of a first hinge to a first rotation point of said first gripping portion.

Preferably, said first hinge is near a first end of said first rod.

Preferably, said articulated parallelogram comprises a second rod which is secured by means of a second hinge to a second rotation point of said first gripping portion.

Preferably, said second hinge is near a first end of said second rod.

Preferably, said articulated parallelogram comprises a third rod comprising a first pin which is secured to said first rod with possibility to rotate, a second pin which is secured to said second rod with possibility to rotate and a third pin which is secured to a third rotation point of said second gripping portion with possibility to rotate.

Preferably, said articulated parallelogram comprises a fourth rod comprising a fourth pin which is secured to said first rod with possibility to rotate, a fifth pin which is secured to said second rod with possibility to rotate and a third pin which is secured to a fourth rotation point of said second gripping portion with possibility to rotate.

Preferably, said first and second rotation points and said virtual rotation axis are aligned with each other.

Preferably, said third and fourth rotation points and said virtual rotation axis aligned with each other.

Preferably, said articulated parallelogram is realised in such a manner that when said first and second rods are rotated with respect to said first and second rotation points through the same angle, said third and fourth rods follow a translational movement with respect to said first gripping portion while maintaining a mutual parallelism condition, thereby varying the angular orientation of said second gripping portion with respect to said first gripping portion by rotating about said virtual rotation axis.

Thanks to this technical solution, it is possible to realise a retention device in a simple and cost-effective way that can be easily adapted according to variations in the first or second gripping portion or in the preferred position in space of the virtual rotation axis.

In addition, this structure guarantees excellent solidity and reliability during use even at high speed and frequency of movement.

Preferably, said virtual rotation axis is located outside said retention device and in a region in proximity of said retention device. Preferably, said proximity region is identified with a portion of the space surrounding said retention device and in which said blank is located when it is secured thereto.

In an embodiment, said proximity region has a spacing from said blank when it is secured to said retention device which is equal to 10 times the thickness of said blank, more preferably equal to 5 times the thickness of said blank and even more preferably equal to 2 times the thickness of said blank.

In another embodiment, said proximity region has a spacing from a retention surface of said blank defined on said first gripping portion or on said second gripping portion which is equal to 20 mm, more preferably equal to 15 mm and even more preferably equal to 10 mm.

In this way it is possible to let the rotation of the blank happen in such a manner that the local deformations linked to the rotation are substantially the predominant deformations, i.e. that the deformations induced by possible translations of the material of the blank are negligible compared to those produced by rotation, and that the latter are contained.

The person skilled in the art will be able to assess the most appropriate proximity interval depending on the thickness and type of material of the blank to be treated.

In fact, it is possible that materials with a lower elastic modulus (therefore more yielding) than others can tolerate greater proximity intervals than those tolerable by more rigid materials.

In this way it is possible to proceed efficiently and quickly with the movement of the blank without causing excessive damage.

Preferably, said virtual rotation axis passes through said blank when it is retained by said retention elements.

In this way it is ensured that in the material of the blank there is the least possible optimal deformation (and therefore the least damage) since only a pure rotation acts in it without any further contribution of translation. In fact, as previously discussed, the addition of a translational component on the blank would induce a further deformation component in the blank.

Preferably, said virtual rotation axis coincides with a region of greater yielding of the blank. More preferably, said virtual rotation axis coincides with a creased portion in said blank.

In this way, it is possible to further contain and control the deformation induced in the blank as it occurs in the zone of the creased portion which is structurally and functionally configured to allow rotations about itself.

Preferably, said first and second retention elements are substantially planar.

This makes it possible to retain portions of the planar blank ideally and firmly during the movements thereof.

In one embodiment, said first gripping portion is fixedly secured to said support.

In another preferred embodiment, said retention device comprises a movement device which is configured to move in translation said first gripping portion and said second gripping portion.

Preferably, said movement device move in translation simultaneously said first and second gripping portion.

Preferably, said first and second gripping portion are moved in translation with respect to said support or with respect to another predetermined reference, such as for example a drum on which the retention device is mounted.

Thanks to this technical solution, it is possible to facilitate the grip, the transfer and the movement of the blank by adding an additional movement component of the first and second gripping portion.

Preferably, such a movement device may comprise cam kinematics or a track-runner system or even a device that moves following the rotation of a worm screw.

Preferably, said retention device is mounted on a drum, or on a runner, or on a track, or on a belt.

In this way it is possible to move the blank along a desired path while it is being retained by the retention device. This technical solution makes it possible to carry out a fast and continuous process for moving a blank.

Preferably, said first gripping portion and said second gripping portion are mounted on a drum and can be moved in translation in a direction having a radial component of said drum.

In this way it is possible to further modify the direction in which the retention device moves. In particular, this variation may be implemented near or at the removal and/or release and/or folding zones.

Preferably, said movement unit comprises a pre-folding device which is configured to collaborate with said retention device to fold predetermined portions of said blank.

In this way, said parts of the blank, such as creased portions, strips, flaps, etc., can be deformed or yielded to make them less rigid and therefore easier to work, thus improving and simplifying subsequent gluing or jointing.

Moreover, said technical solution also makes it possible to better manage the spatial arrangement of the predetermined parts, particularly when it comes to panels or flaps, in order to ideally guide them in the desired orientations to additional movement devices.

Preferably, said first gripping portion of said retention device is placed upstream of said second gripping portion in accordance with a rotation direction of said drum.

Thanks to this technical solution it is possible to improve the control of the blank during the rotation of the drum by producing a retention constraint on the portion of the blank downstream of said first gripping portion of the retention device, which is the first to be subjected to the relative air flow produced during rotation and therefore the one most subject to the possibility of producing the sail effect described above.

Preferably, said drum comprises a cam type rotation mechanism which is configured to produce a variation of angular rotation speed of said retention device with respect to said drum.

In this way it is possible to vary the angular speed of the retention device with respect to the angular speed of the drum, possibly even being able to produce a stoppage of the retention device while the drum continues its rotary movement uninterruptedly. Thanks to this technical solution, it is possible to carry out operations relative to the blank (e.g. folding, removal, release, etc.) when it has a speed practically equal to zero.

According to one embodiment, said cam type rotation mechanism also acts as a movement device which allows moving the first and second gripping portion of the retention device in a direction having a radial component with respect to the rotation axis of the drum.

Preferably, said movement unit comprises a plurality of retention devices which are arranged so as to be equidistant with angular spacing in accordance with an axis of symmetry which passes through the rotation axis of said drum. Thanks to this technical solution it is possible to further increase the process speed while maintaining a mono-flow advance of the blanks.

Preferably, said plurality of retention devices is equal to three.

The Applicant has assessed that this technical solution represents an ideal compromise between the process speed of the blanks, the overall steric sizes of the retention devices in the rotating drum and the consequent maximum usable angular speed in order to optimise productivity by reducing the risk of damage due to possible collisions between moving parts.

Furthermore, this solution identifies an ideal compromise between productivity and the weight of the retention devices which is applied to the drum.

Preferably, said movement unit comprises a plurality of said drums each one comprising at least one of said retention devices and said plurality of retention devices being arranged in such a manner as to be able to change said blank between a first retention device and a second retention device which are secured to different drums, respectively.

Thanks to this technical solution, it is possible to carry out the passage of blanks in a simple, effective and fast way by realizing a change of orientation with respect to the faces presented and thus optimally controlling the position of the desired parts of the blank.

Preferably, said process comprises the step of retaining an abutment panel of said blank by means of said first gripping portion and a lateral panel of said blank by means of said second gripping portion, in such a manner that said lateral panel is downstream with respect to said abutment panel in accordance with said rotation direction of said drum.

Thanks to this embodiment, it is possible to manage the control the lateral panel of the blank during the rotation of the drum which, if left free, would tend to flex freely, risking getting caught in parts of the retention unit or outside it, thus risking compromising the movement process according to the sail effect described above.

Preferably, while said drum rotates between said removal position and said release position, a desired folding of said blank is produced between said abutment panel and said lateral panel by means of said retention device.

In other words, the process envisages being able to carry out a specific folding of said blank with minimisation of the damages resulting from deformation while it is retained by said retention device, thanks to the possibility of rotating the second gripping portion with respect to the second gripping portion about to the virtual axis of rotation.

Preferably, while said drum rotates between said removal position and said release position, the process comprises the step of producing a desired folding of longitudinal attachment flaps of said blank by means of a pre-folding device which collaborates with said first and second gripping portion.

In this way it is possible to further deform the folding zone and to make it more yielding so that the blank is more workable in the following steps.

Preferably, during the rotation of said drum, a stoppage of said retention device is produced.

In particular, it is preferred that such a stoppage of the retention device is produced during the removal and/or release step of the blank and/or during a folding or pre-folding step of the blank.

In this way it is possible to reduce the relative speed of the retention device by letting it stop and making any desired operations to be carried out easier and more effective with the blank or on the blank.

Preferably, said stoppage is obtained by means of said cam type rotation mechanism.

Preferably, the process comprises the step of rotating a first drum of said movement unit which retains said blank towards said release position and of rotating a second drum of said movement unit in a synchronized manner with said first drum.

Preferably said second drum rotates with an opposite direction to said first drum.

Preferably, the process provides for facing said second gripping portion of said retention device which is secured to said first drum with a second gripping portion of a retention device which is secured to said second drum.

Preferably, the process provides for facing said first gripping portion of said retention device which is secured to said first drum with a first gripping portion of said retention device which is secured to said second drum.

Preferably, the process provides for maintaining said retention elements of said retention device which is secured to said first drum while the retention elements of said retention device which is secured to said second drum are also activated.

Preferably, the process provides for deactivating said retention elements of said retention device which is secured to said first drum while said retention elements of said retention device which is secured to said second drum are kept active.

In this way, it is possible to quickly and precisely transfer the blank from a first drum to a second drum and thus continue the aforesaid process for moving said blank in a continuous and uninterrupted manner.

Preferably, the process further provides for rotating said second drum as far as a release position and, in the meantime, for rotating about a virtual rotation axis a second gripping portion with respect to a first gripping portion of said retention device which is secured to said second drum.

Preferably, said retention device is moved in a direction having a radial component with respect to a rotation axis of said drum.

In this way, it is possible to move the blank even more effectively in order to have it engaged on desired devices or stations.

The characteristics and advantages of the invention will become clearer from the detailed description of an embodiment illustrated, by way of non-limiting example, with reference to the appended drawings in which.

Figure 1:
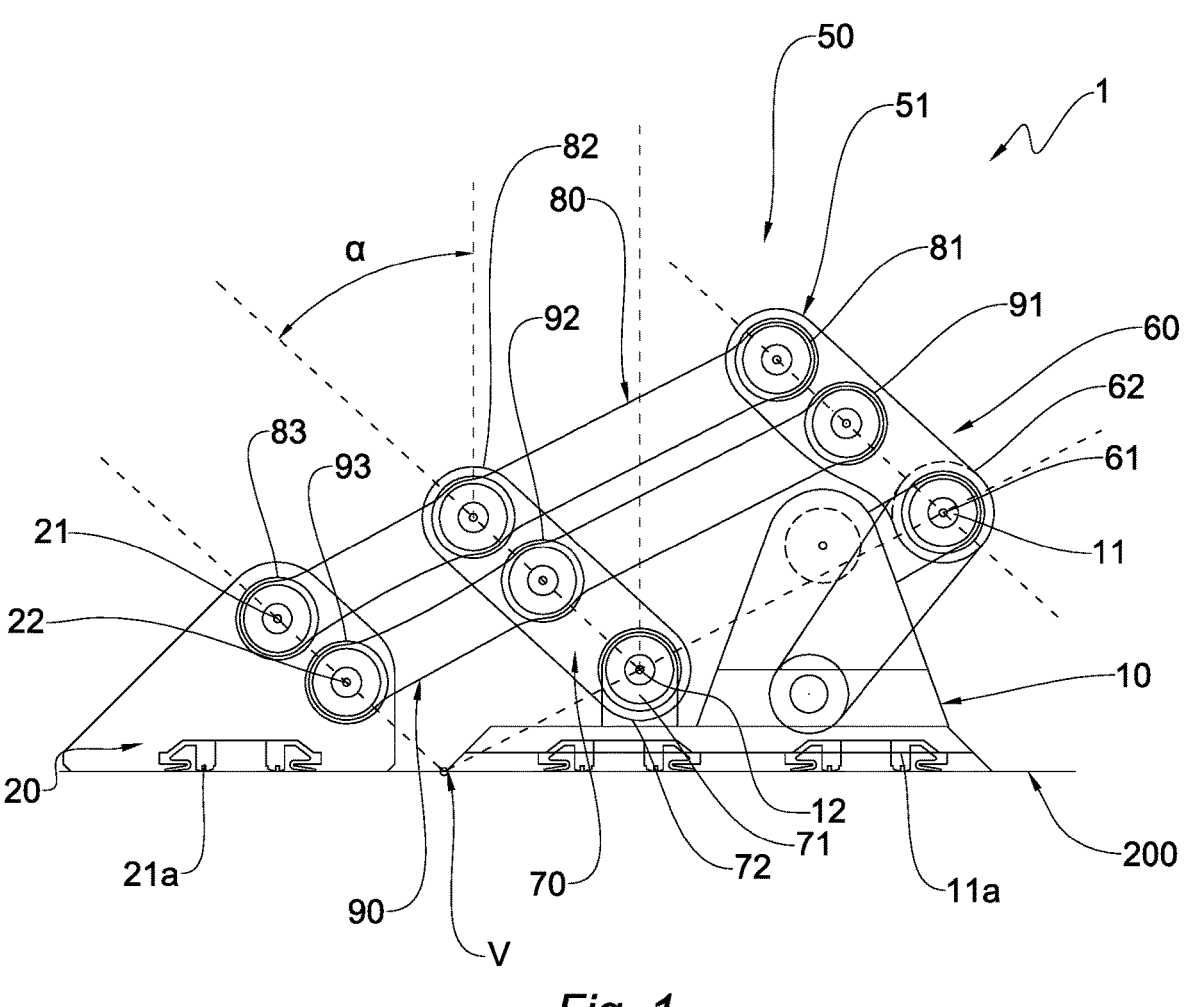
FIG. 1 is a schematic side view of a retention device in an aligned configuration made in accordance with the present invention.
Figure 2:
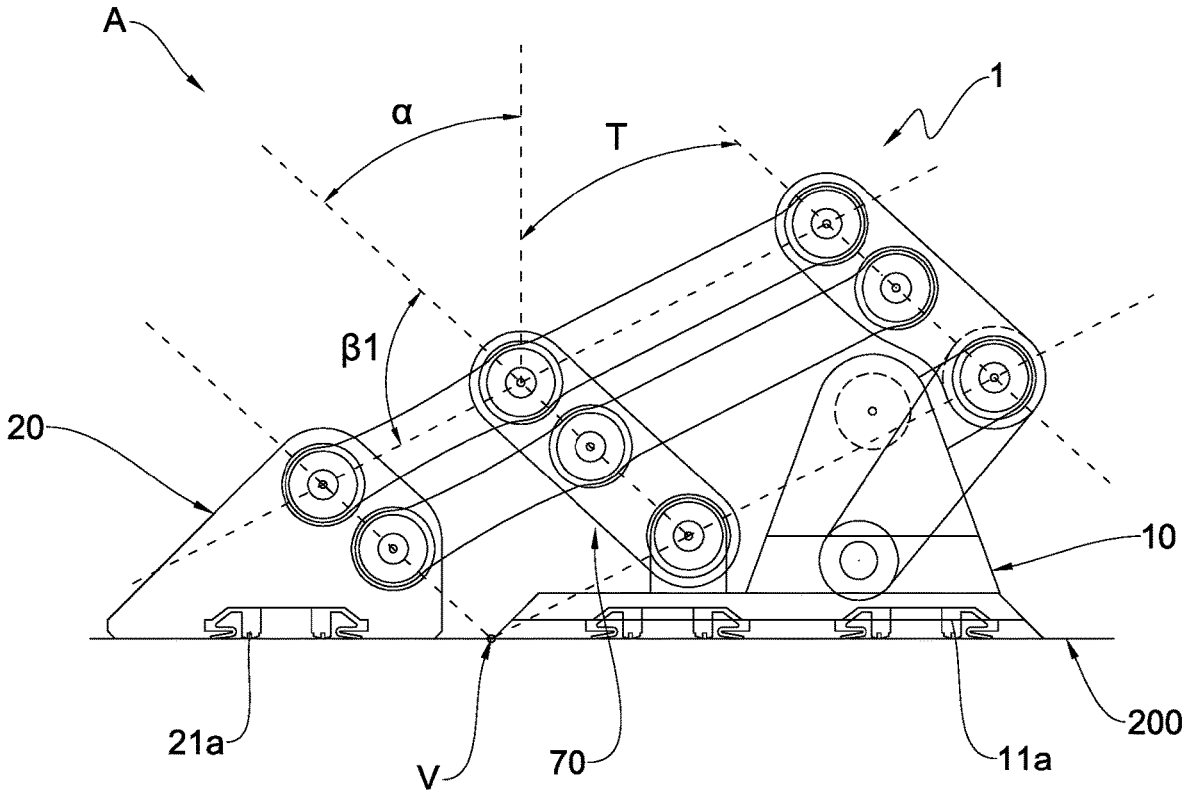
FIG. 2 is a further schematic side view of the retention device in FIG. 1.
Figure 4:
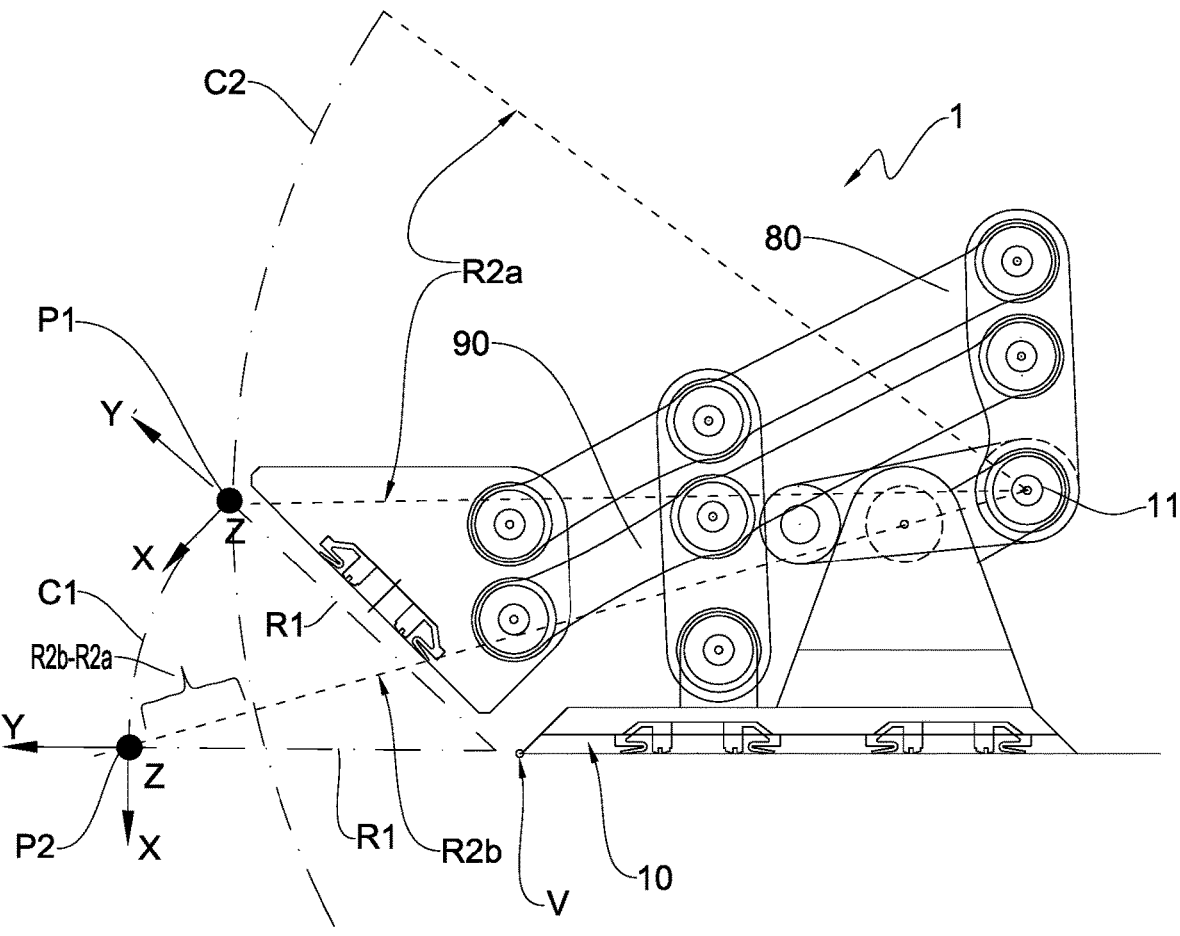
FIG. 4 is a further schematic side view of the retention device in FIG. 3.
Figure 5C:
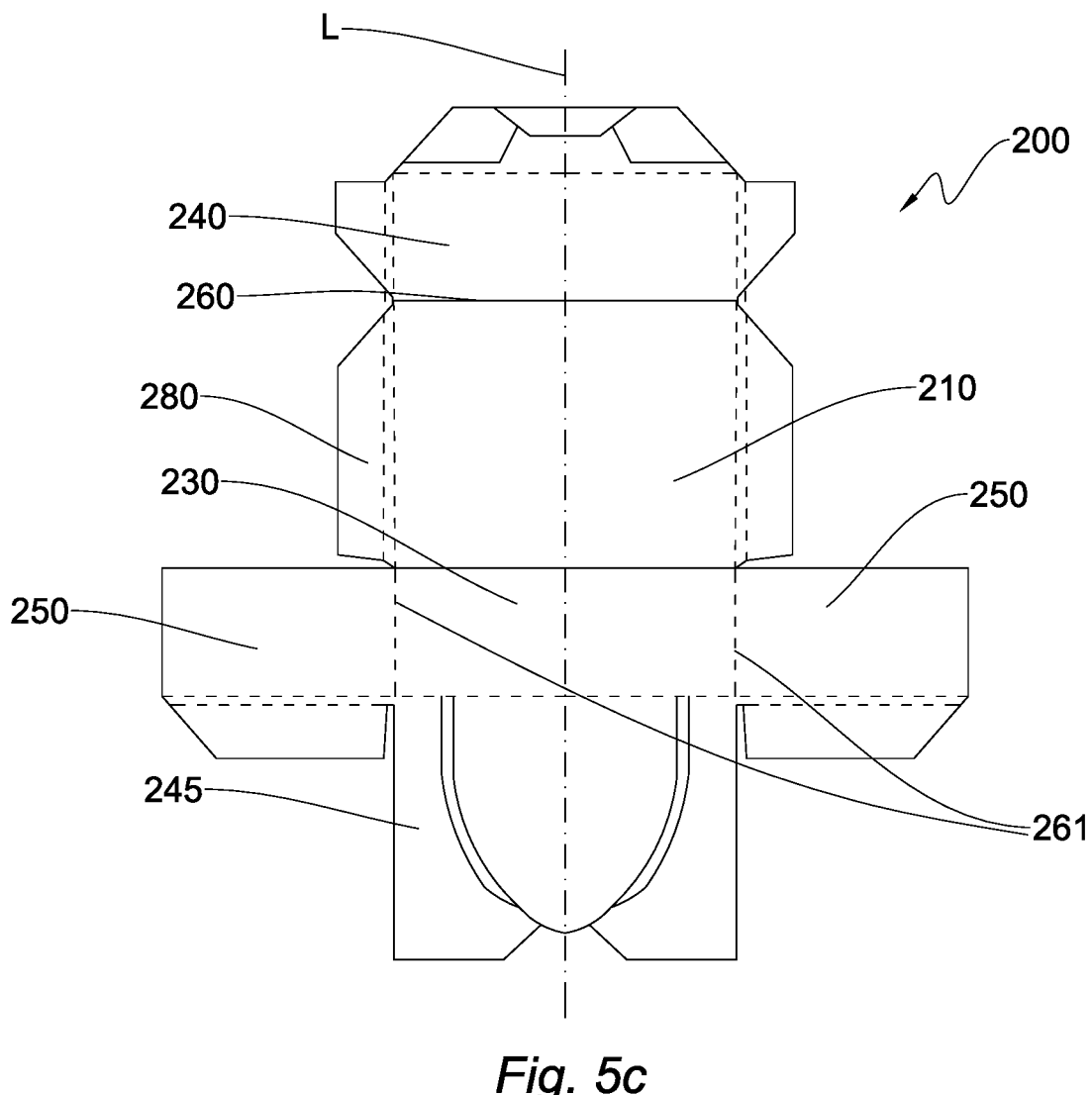
Figure 6:
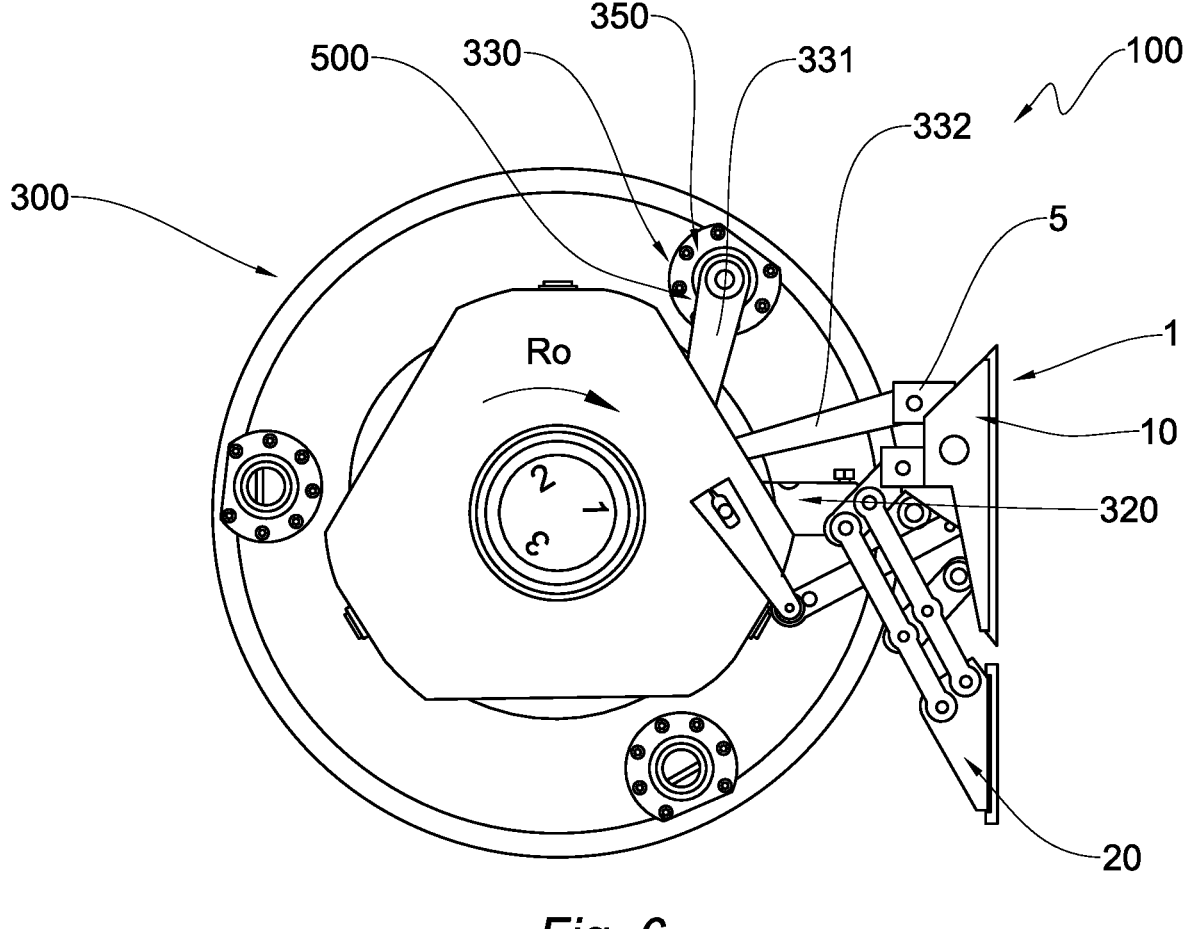
Figure 10:
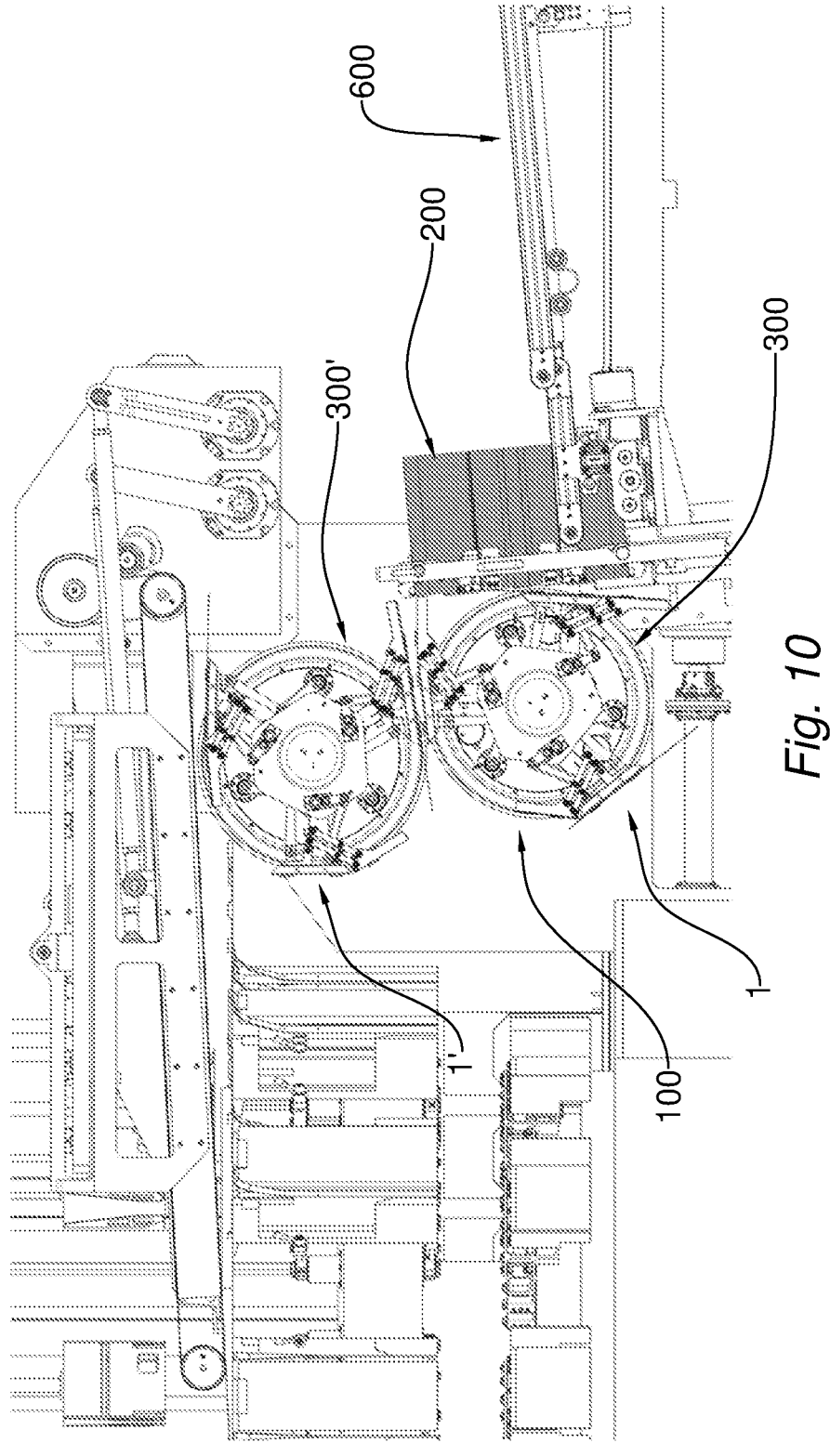
Figure 11:
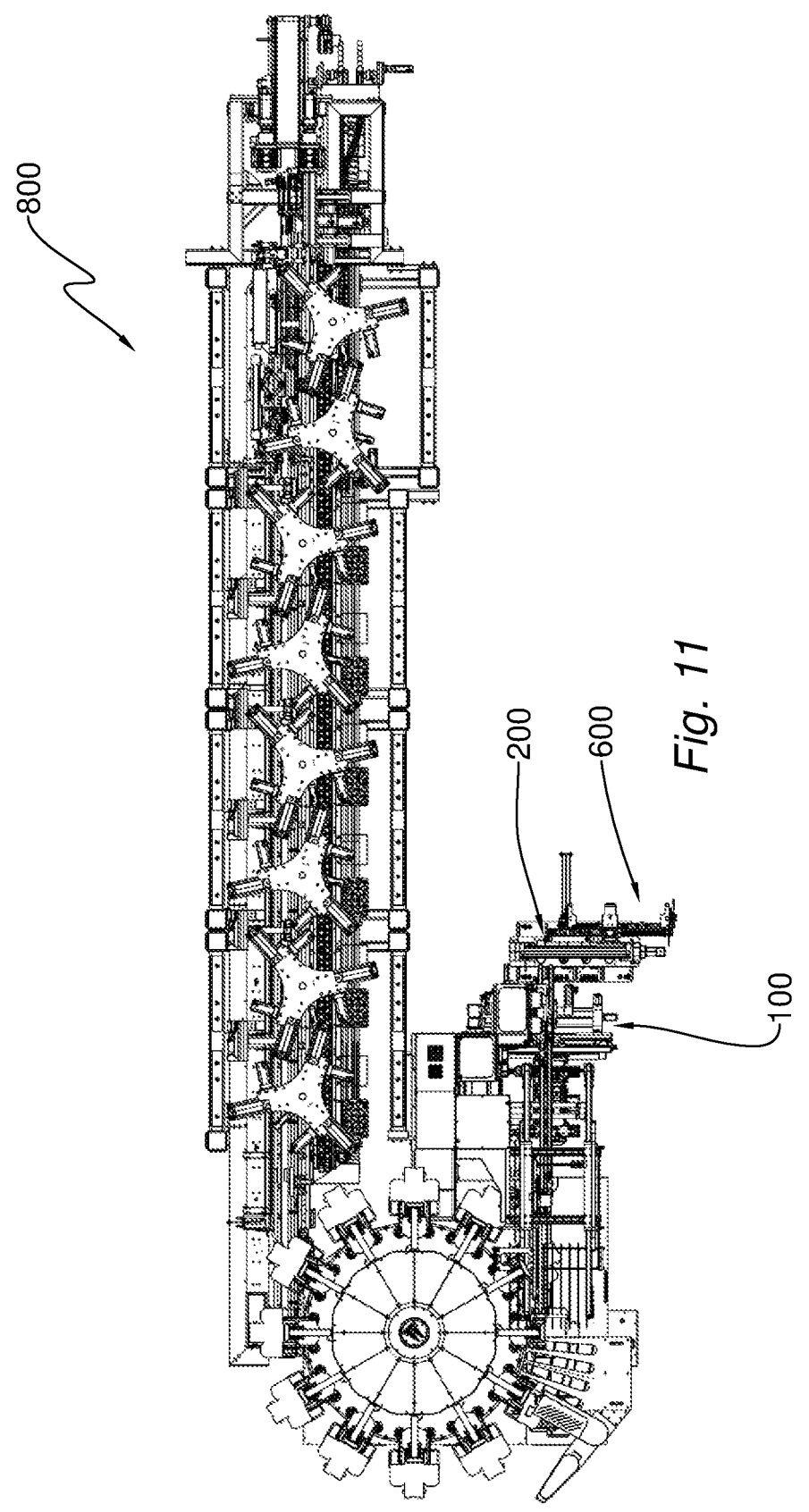

FIGS. 5*a* and 5*b* are a perspective view of the retention device in FIG. 2 and FIG. 4 respectively;

FIG. 5*c* is a top view of a blank usable by the present invention;

FIGS. 6, 7, 8 and 9 each represent a schematic side view of a movement unit provided with the retention device of FIG. 1 in a different operational step;

FIG. 10 is a schematic side view of a further embodiment of the movement unit in FIG. 6;

FIG. 11 is a top view of a packing apparatus for articles comprising the forming unit in FIG. 6.

With initial reference to FIG. 11, 800 denotes a packing apparatus which is provided to form a container from a blank 200 and, further, to fill the container thus formed with a plurality of loose articles, so as to obtain a finished package which is intended to be packaged for shipment.

The embodiment example described below refers to articles to be packed in a container, in particular a box-shaped container in which articles that are different from each other, or the same but in different configurations, are arranged in a sorted manner, for example arranged on superimposed layers.

In the specific case described herein, the articles with which the containers are filled are capsule elements for the preparation of beverages by infusion, in particular coffee capsules.

In the present example, each blank 200 is a flat laminar element made of foldable, semi-rigid material, for example cardboard, suitably cut and provided with folding lines, preferably formed by creased portions 260.

As better visible in FIG. 5*c*, the blank 200 has a substantially cross shape comprising a front panel 230 with a quadrilateral shape from which additional panels branch out according to the normal directions of the respective edges.

More in detail, an abutment panel 210 and a closing panel 245 opposite the front panel 230 with respect to the abutment panel 210 are connected along the longitudinal axis L of its cross shape from the front panel 230. Again along the longitudinal direction L, there is identified a rear panel 240 which is connected to the abutment panel 210 on the opposite side of the front panel 230.

Further, two opposite lateral panels 250 are identified, which are connected to the front panel 230 at the other two edges thereof. The creased portions that are parallel to the longitudinal direction are defined as longitudinal creased portions and identified by the number 261.

All the aforementioned panels have a quadrilateral shape, preferably rectangular, so that the container obtained from the blank 200 is substantially box-shaped or parallelepiped.

In particular, the abutment panel 210 will define the bottom of the container, while the rear panel 240, the front panel 230, and the lateral panels 250 of the blank 200 will correspond respectively to the rear wall, to the front wall and to the lateral walls of the container. Finally, the closing panel 245 will define an openable wall of the container, which is intended to close an opening defined in the container by the rising of the lateral panels 250, of the front panel 230 and of the rear panel 240.

Preferably, the abutment and rear panels 210, 240 have, on each edge which branches parallel to the longitudinal axis L of the blank 200, respective longitudinal fixing flaps 280 having trapezoid shape, with a free edge connected by inclined edges.

Further flaps can be made on any free edge of each panel of the blank.

The rear panel 240 also has, in addition to the longitudinal fixing flaps 280, a closing flap which is articulated thereto on the opposite side of the abutment panel 210.

With reference to FIG. 1, an embodiment of a retention device 1 is shown which comprises a first gripping portion 10 which is provided to retain a portion of the blank 200 and a second gripping portion 20 which is provided to retain an additional portion of the blank 200. A support 5 corresponding to a solid portion to which the first gripping portion 10 is secured is identified in FIG. 6. Such support 5 will be described below.

The first gripping portion 10 and the second gripping portion 20 comprise respectively first and second retention elements 11*a*, 21*a* for retaining the blank 200, the first and second retention elements 11*a*, 21*a* are represented in FIGS. 1 to 4 as suction cups acting with pressure reduction.

Still with reference to FIGS. 1 to 4, it can be noted that the second gripping portion 20 is secured to the first gripping portion 10 by means of a movement mechanism 50 which is configured to carry out a pure rotation of the second gripping portion 20 about a virtual rotation axis V which is located outside the retention device 1. It should be noted that the virtual rotation axis V in FIGS. 1 to 4 is shown perpendicular to the plane of the sheet. From FIG. 1, it can be noted that the virtual rotation axis V is preferably defined on the blank 200 and even more preferably in coincidence with one of the longitudinal creased portions 261.

Figure 3:
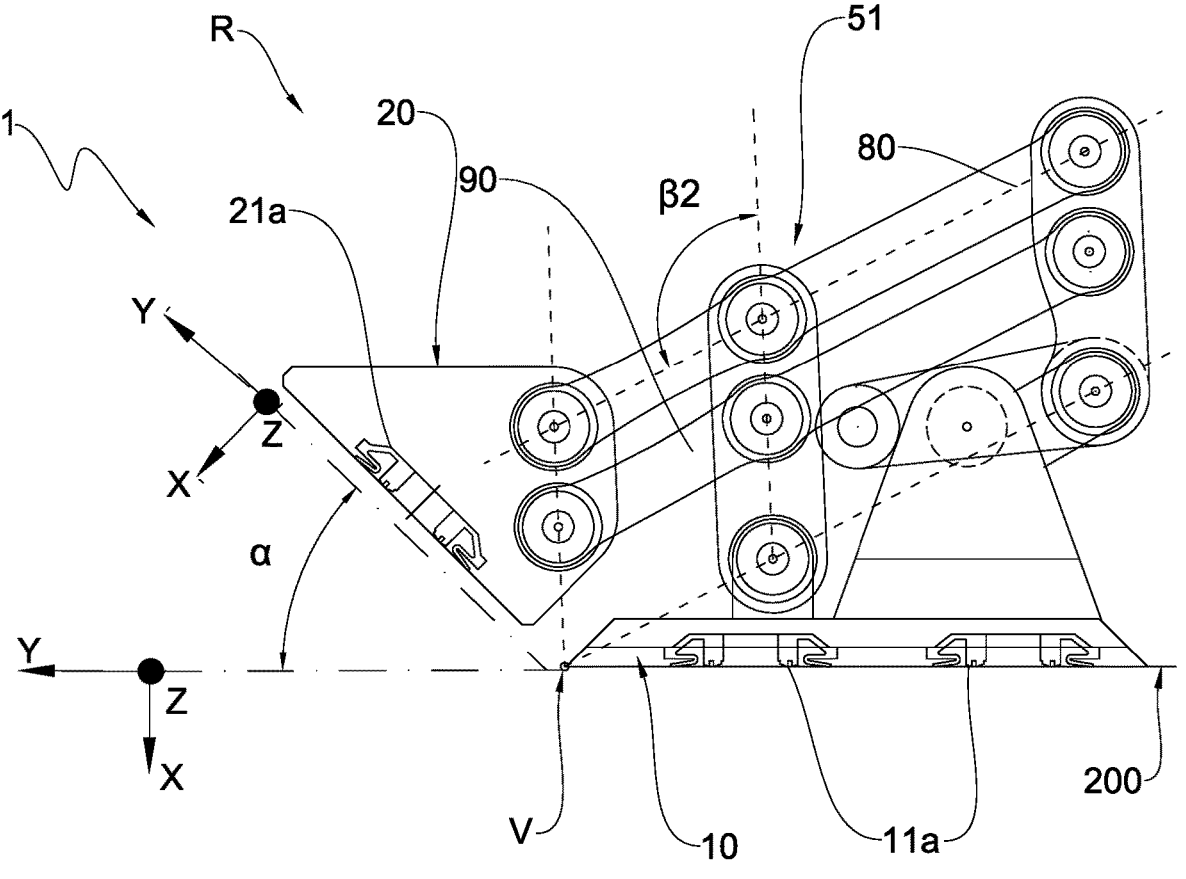
FIG. 3 is a schematic side view of the retention device of FIG. 1 in a rotated configuration.

In this way, the retention device 1 can pass from an aligned configuration A, shown in FIGS. 1 and 2, in which a first retention surface 15 and a second retention surface 25 respectively of the first and second gripping portions 11a, 21a of the first and second gripping portions 10, 20 are substantially aligned and coplanar with each other, to a rotated configuration R, shown in FIGS. 3 and 4, in which the aforesaid retention surfaces 15, 25 are transverse to each other.

Clearly, when in use, the retention elements 11a and 21a secure the blank 200 to the retention device 1 and which is also deformed according to the aligned configuration A or rotated configuration R.

Furthermore, the virtual rotation axis V passes near an edge of the first gripping portion 10 facing the second gripping portion 20, for example a few millimetres from said edge, so as to favour the folding of the blank 200 at the creased portion 261.

As discussed above, it is significant to note that thanks to the retention device 1, it is possible to carry out a pure rotation about the virtual rotation axis V.

The geometrical direction of this movement is represented in FIG. 4, in which a same point of the second gripping portion 20 is considered, which passes from the position P1 in rotated configuration R to the position P2 when in aligned configuration A. As can be clearly seen, the movement from P1 to P2 draws an arc of circumference C1 which is centred on the virtual rotation axis V having a fixed radius R1.

Again with reference to FIG. 4, it can be understood that this movement of pure rotation is only valid when the virtual rotation axis V is considered, whereas if other physical parts of the retention device 1 are taken into account, this type of movement requires a more complex description and performance.

In order to make this clearer, in FIG. 4 the movement of the same point previously analysed of the second gripping portion 20 in position P1 is considered, which carries out a pure rotation with respect to a reference point 11 (this arbitrary point will be discussed in more detail below).

Since the movement is pure rotation, all the components of the retention device 1 between the reference point 11 and the position P1 must be considered as being fixedly secured to each other, i.e. as a rigid body. As can be noted again from FIG. 4, the point of the second gripping portion 20 in the position P2 now determines a second radius R2a with respect to the reference point 11 that identifies a second arc of circumference C2. By drawing the segment R2b which joins the position P2 of the second gripping portion 20 with the reference point 11, it is clear that this radius is greater than the second radius R2a. In fact, it is immediately evident that in order for the second gripping portion 20 to be able to move from the second arc of circumference C2 as far as the position P2 is reached, it is necessary to add a translational movement having a component equal to the absolute value of the difference of the two radii R2b and R2a (|R2b-R2a|). This therefore implies that, with respect to the reference point 11, the second gripping portion 20 carries out, in the embodiment considered, a roto-translation movement.

It is also interesting to note that according to the pure rotation considered about the reference point 11, the vector XYZ in position P1 would not arrive with the same orientation as the one in position P2 and that probably the second gripping portion 20 would be hindered in its rotation by the presence of the first gripping portion 10.

In fact, in order for the second gripping portion 20 to be able to reach the second position P2, there must be a translation that allows the second gripping portion 20 to avoid colliding on the first gripping portion 10. In addition, it is necessary that there is a further variation of the rotation so as to be able to align the triad of vectors XYZ as desired.

The movement mechanism 50 shown in FIGS. 1 to 4 is an articulated parallelogram 51 which is secured to the first gripping portion 10 and to the second gripping portion 20. Said articulated parallelogram 51 comprises a first rod 60 comprising a first hinge 61 which is located near a first end 62 of the first rod 60 and the first rod 60 being secured by means of the first hinge 61 to a first rotation point 11 (previously used as an example of a possible reference point) of the first gripping portion 10.

Furthermore, said articulated parallelogram 51 comprises a second rod 70 comprising a second hinge 71 which is located near a first end 72 of the second rod 70 and the second rod 70 being secured by means of the second hinge 71 to a second rotation point 12 of the first gripping portion 10.

The articulated parallelogram 51 also comprises a third rod 80 comprising a first pin 81 which is secured to the first rod 60 with possibility to rotate, a second pin 82 which is secured to the second rod 70 with possibility to rotate and a third pin 83 which is secured to a third rotation point 21 of the second gripping portion 20 with possibility to rotate.

Finally, said articulated parallelogram 51 comprises a fourth rod 90 comprising a fourth pin 91 which is secured to the first rod 60 with possibility to rotate, a fifth pin 92 which is secured to the second rod 70 with possibility to rotate and a third pin 93 which is secured to a fourth rotation point 22 of the second gripping portion 20 with possibility to rotate.

As can be noted from FIGS. 1 to 4, thanks to this specific embodiment of an articulated parallelogram, the virtual rotation axis V remains unambiguously determined by the intersection of the line joining the first and second rotation point 11, 12 and the line joining the third rotation point 21 and fourth rotation point 22. In other words, it is as if the virtual rotation axis V were the ninth pin, fixed, of the articulated parallelogram 51 described above.

Thus, when the first and second rods 60, 70 are rotated with respect to said first and second rotation point 11, 12 through the same angle a, the third and fourth rods 80, 90 follow a translational movement T with respect to said first gripping portion 10 while maintaining a mutual parallelism condition.

Referring now to FIGS. 2 and 3, it can be noted that the angle with which the second gripping portion 20 rotates to reach the rotated configuration R is the same angle α with which the first and second rods 60, 70 rotate with respect to their position in the aligned configuration A (e.g. the angle a with respect to the second pin 82 is shown).

Again with reference to FIGS. 2 and 3, the orientation of the third rod 80 with respect to the second rod 70 is now considered: it is noted that in the aligned configuration A (shown in FIG. 2) the angle between them is equal to β1, while in the rotated configuration R (shown in FIG. 3) the angle between them is varied and equal to β2.

Therefore, during the movement from the aligned configuration A to the rotated configuration R, a plurality of rotations contribute together with a translational contribution of the second gripping portion 20 with respect to the first gripping portion 10.

This condition is also represented by the perspective views shown in FIGS. 5a and 5b. They correspond respectively to FIGS. 2 and 3 previously described in which the folding of the blank 200 which is secured to the retention device 1 in the aligned configuration A and rotated R can be further evaluated.

Figure 8:
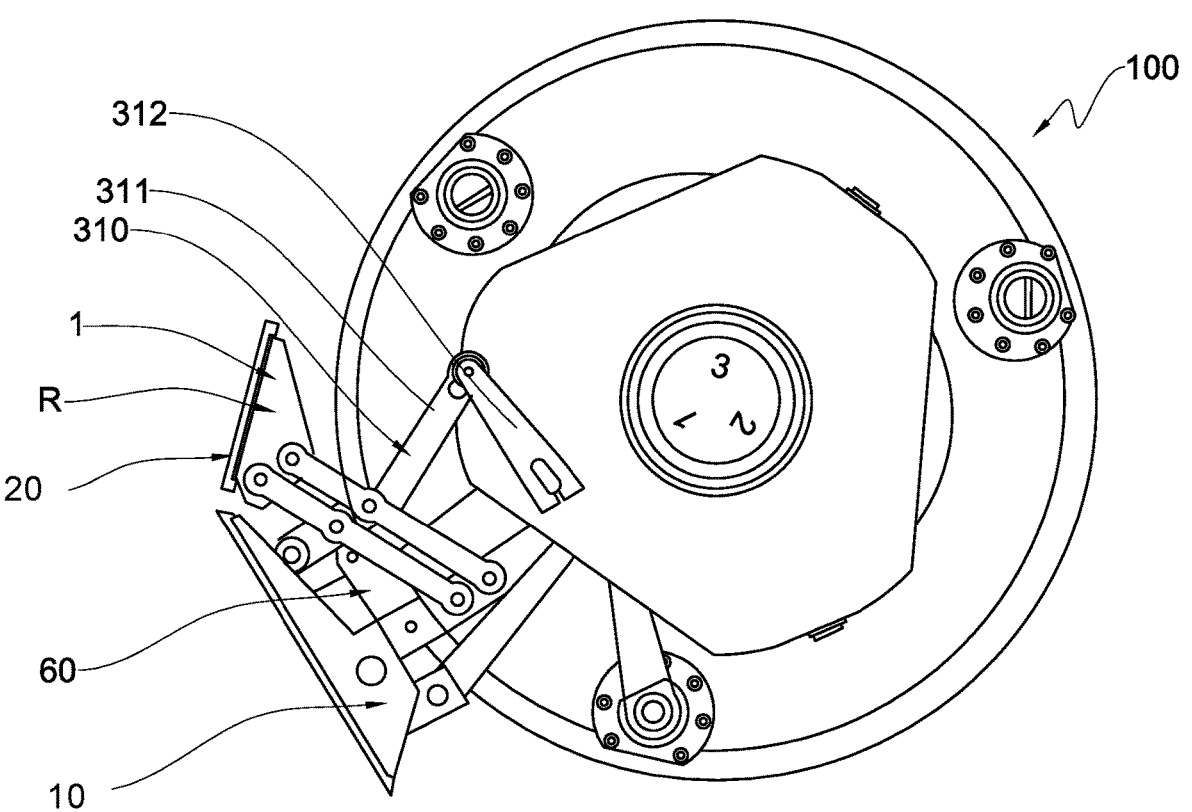

With reference to FIG. 1 and FIG. 8, it can be noted that the rod 60 has a lateral extent at the end thereof 62 which gives it an overall "L" shape. The free lateral end of this "L" is configured to be able to be moved by a first actuator 310 that causes the first rod 60 to rotate about the first pin 61, thereby reversibly letting the retention device 1 pass from the aligned configuration n A to the rotated configuration R.

FIGS. 6 to 9 show a movement unit 100 comprising a drum 300 to which the retention device 1 is secured.

With reference to FIG. 8, it can be seen that the first actuator 310 comprises a first actuating rod 311 and a second actuating rod 312 which are secured to each other with possibility to rotate by means of a hinge and the first actuator rod 311 being connected to the lateral extent of the first rod 60 with possibility to rotate and the second actuating rod 312 being connected with possibility to rotate to an actuating motor (not shown in the figure) of the drum 300.

With reference to FIG. 6, a second actuator 320 and a third actuator 330 are identified, both connected to the first gripping portion 10.

In this embodiment, the second actuator 320 is a rod which is connected at one end to the first gripping portion 10 and at the other end to the drum 300. Said second actuator 320 collaborates with the third actuator 330 which comprises a first and a second bar 331, 332 which are connected to each other with possibility to rotate and the first bar 331 being connected to the drum 300 while the second bar 332 is connected with possibility to rotate by means of a hinge to the support 5 which is secured to the first gripping portion 10.

In this manner it is possible to move said first and second gripping portion 10, 20 with respect to the drum 300.

It is interesting to note that, again with reference to FIGS. 6 to 9, the second actuator 320 and the third actuator 330 thus described can serve both as a movement device 500, configured to move in translation simultaneously the first and second gripping portion 10, 20 with respect to the drum 300 in a direction having a radial component of the drum 300, and as a cam type rotation mechanism 350 that allows to carry out a stoppage of the retention device 1 with respect to the continuous rotational movement of the drum 300.

In alternative embodiments (not shown in the figures), a movement device 500 is provided to be realised comprising a track which is secured to the support 5 and a runner which is secured to the first gripping portion 10. Also in this way it is possible to carry out a further movement of the first and second gripping portion 10, 20 with respect to the drum 300.

According to one embodiment, the retention device comprises lightweight materials with a high modulus of elasticity such as fibreglass or carbon fibre composites. In addition, the retention device 1 includes rapid disengagement devices for the rapid disengagement from the drum 300 in order to be able to replace it quickly and easily.

FIG. 6 shows the movement unit 100 in a removal position, in which the retention device 1 may activate the retention elements 11a, 21a to remove a blank 200 from a horizontal hopper 600.

Figure 7:
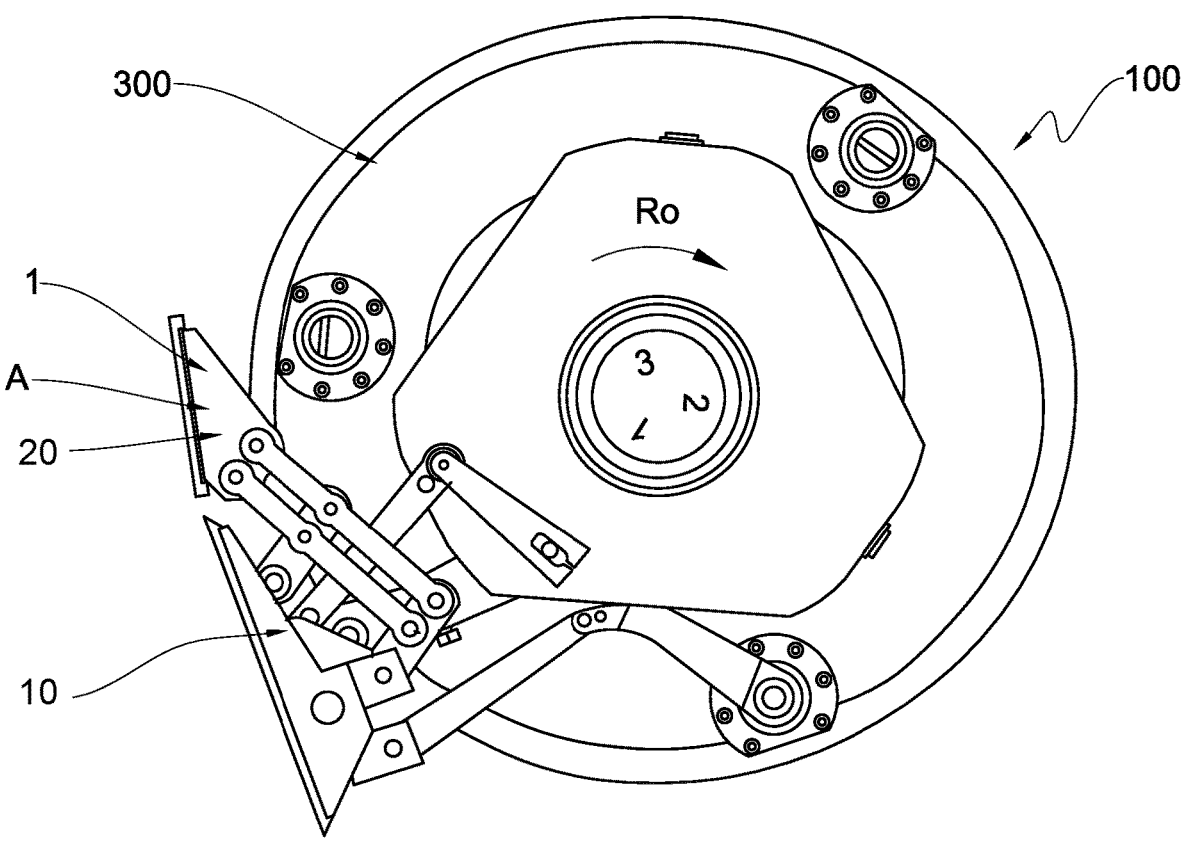

FIGS. 7 and 8 show a condition in which the second and third actuator 320, 330 are rotated in the opposite direction with respect to the rotation direction Ro of the drum 300 to thereby produce a stoppage of the retention device 1 and thus also of the retained blank 1. Such a stoppage may be useful to make the retention device 1 collaborate with a pre-folding unit (not shown in the figures) having rotating teeth which are capable of engaging on predefined surfaces of the blank and of rotating them in a desired direction.

As shown in FIG. 8, the retention device 1 passes during this stoppage from the aligned configuration A to the rotated configuration R by means of the first actuator 310. Preferably, the pre-folding unit engages on the opposite side of the blank 200 with respect to the side retained by the retention device 1 in order to even more effectively guide the folding of the blank and simultaneously acts on further portions of the blank by also folding them about the virtual rotation axis V of the angle α.

Figure 9:
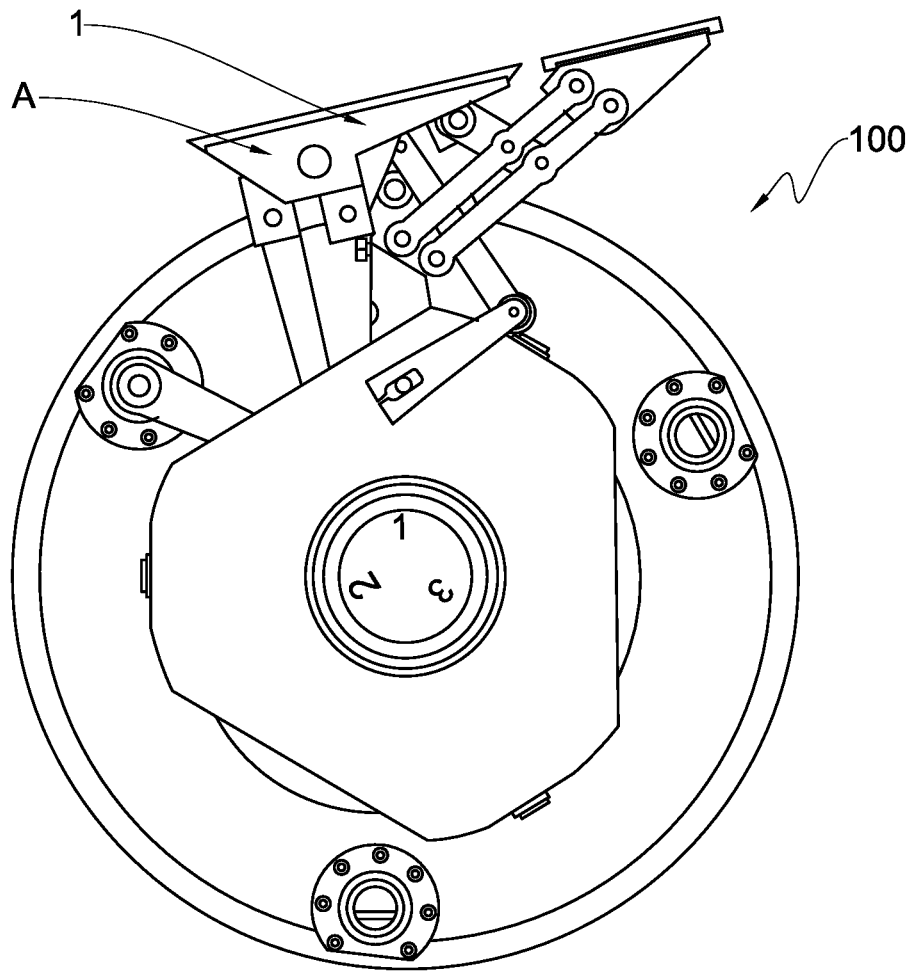

FIG. 9 shows a release position of the movement unit 100 in which the retention device 1 can deactivate the retention elements 11a, 21a to release the blank 200 and allow it to be removed by an additional processing device.

The movement unit 100 may comprise a plurality of retention devices 1. In particular, and with reference to FIG. 10, it is noted that the movement unit 100 comprises three retention devices 1 which are arranged according to an axis of ternary symmetry passing through the rotation axis of the drum 300.

Again with reference to FIG. 10, an embodiment is shown in which the movement unit 100 comprises in addition to the drum 300 a second drum 300', positioned near the drum 300, to which the blank 200 is transferred when the drum 300 is in the release position. The second drum 300' is entirely analogous to the drum 300, rotates in a synchronized manner but with an opposite direction in relation to the drum 300 and, moreover, it also comprises three retention devices 1', entirely analogous to the retention devices 1 described above.

The passage of the blank 200 between the drum 300 and the second drum 300' takes place between a retention device 1 in a release position and a corresponding retention device 1' which is secured to the second drum 300', which, in the rotation movement of the second drum 300' directly faces the retention device 1 on the opposite side to the blank 200.

Preferably, when the passage between the drum 300 and the second drum 300' takes place, a stoppage of both retention devices 1, 1' is carried out by means of respective cam type rotation mechanisms. During the stoppage, the retention elements 11a, 21a of both retention devices 1, 1' are kept active for a minimum time, generally under 1 second, in order to ensure a secure grip of the blank 200 by both retention devices involved, after which the retention elements of the retention device 1 are deactivated and are kept active only those of the retention device 1' which are secured to the second drum 300'.

As can be seen from the foregoing, the movement unit 100 is capable of continuously moving and processing the blanks 200 collected in a removal zone.

In fact, as clearly illustrated in FIGS. 6 and 10, the drum 300 rotates continuously in a clockwise direction starting the removal process from the horizontal hopper 600 (shown in FIG. 10) which is positioned immediately upstream with respect to the movement unit 100. Here the retention device 1 assumes the aligned configuration A and activates the retention elements 11a, 21a to secure the blank to itself until the following release.

The drum 300 then rotates through approximately 150°-180° with respect to the removal position and reaches the pre-folding position (shown in FIGS. 7 and 8). In this case, it can be noted that thanks to the second and third actuator 320, 330 it is also possible to carry out the stoppage of the retention device 1, while the drum 300 continues its continuous movement, in order to provide a longer time for the pre-folding process.

Subsequently, when the drum 300 in continuous movement makes a rotation through approximately 270° with respect to the removal position of the blank 200, it is reached the release position (shown in FIG. 9) in which once again a stoppage of the retention device 1 is carried out by means of the aforesaid second and third actuators 320, 330, the aligned configuration A of the retention device 1 is assumed and the retention elements 11a, 21a acting on the blank are deactivated.

Finally, the drum 300 accomplishes its 360° rotation and the retention device 1 is returned to the ideal configuration for removing a next blank.

It is interesting to note that it is possible to pass from the aligned configuration A to the rotated configuration R at any time of the rotation performed by the drum 300 and that, thanks to the possibility of selectively and independently activating the first actuator 310 with respect to the second and third actuator 320, 330, it is also possible to carry out a stoppage of the retention device 1 at any time of the rotation independently of the configuration in which the retention device 1 is located.

Thanks to these technical solutions, the Applicant has found that he can move at least 50 up to even 200 blanks per minute, depending on the size, overall dimensions and production requirements, with a single line movement unit.

The invention claimed is:

1. A retention device for retaining blanks, comprising:
a support,
a first gripping portion secured to said support, the first gripping portion comprising first retention elements of a blank,
a second gripping portion secured to said support or to said first gripping portion, the second gripping portion comprising second retention elements of said blank, and
a movement mechanism for said second gripping portion with respect to said first gripping portion, said movement mechanism being configured to perform a pure rotation of said second gripping portion about a virtual rotation axis defined outside said retention device,
wherein said movement mechanism comprises an articulated parallelogram secured to said first gripping portion and to said second gripping portion,
wherein said articulated parallelogram comprises:
a first rod secured by a first hinge to a first rotation point of said first gripping portion,
a second rod secured by a second hinge to a second rotation point of said first gripping portion,
a third rod comprising: a first pin rotatably secured to said first rod, a second pin rotatably secured to said second rod, and a third pin rotatably secured to a third rotation point of said second gripping portion,
a fourth rod comprising: a fourth pin rotatably secured to said first rod, a fifth pin rotatably secured to said second rod, and a third pin rotatably secured to a fourth rotation point of said second gripping portion,
wherein:
said first and second rotation points and said virtual rotation axis are aligned with each other; and
said third and fourth rotation points and said virtual rotation axis (V) being aligned with each other,
in such a manner that, when said first and second rods rotate with respect to said first and second rotation points with a same angle, said third and fourth rods follow a translational movement with respect to said first gripping portion while maintaining a mutual parallelism condition, thereby varying an angular orientation of said second gripping portion with respect to said first gripping portion by rotating about said virtual rotation axis.

2. The retention device according to claim 1, wherein said virtual rotation axis passes through said blank when said blank is retained by said retention elements.

3. The retention device according to claim 2, wherein said rotation axis coincides with a creased portion of said blank.

4. The retention device according to claim 1, wherein said rotation axis is close to an edge of said first gripping portion facing said second gripping portion.

5. The retention device according to claim 1, wherein said first gripping portion is fixedly secured to said support.

6. The retention device according to claim 1, further comprising a movement device configured to move in translation simultaneously with said first gripping portion and said second gripping portion.

7. The retention device according to claim 1, wherein said retention device is mounted on an arrangement selected from the group consisting of a drum, a runner, a track, and a belt.

8. A movement unit for moving blanks comprising:
the retention device according to claim 1, and
a drum, said retention device being secured to said drum.

9. The movement unit according to claim 8, wherein said first gripping portion and said second gripping portion are moveable in translation in a direction having a radial component of said drum.

10. The movement unit according to claim 8, comprising a plurality of said retention devices, equidistantly arranged one from another with uniform angular spacing in accordance with an axis of symmetry passing through the rotation axis of said drum.

11. The movement unit according to claim 8, comprising a plurality of said retention devices and a plurality of said drums, each drum secured to at least one of said retention devices, said plurality of retention devices being configured to exchange said blank between a first retention device and a second retention device of said plurality of retention devices, secured to different drums of said plurality of drums.

12. A process for moving a blank, comprising:
providing the movement unit according to claim 8,
moving said drum to a removal position where a retention device of said movement unit faces said blank,
activating said retention elements of said retention device by securing said blank to said retention device,
rotating said drum in a rotation direction from said removal position to a release position,
rotating a second gripping portion of said retention device with respect to a first gripping portion of said retention device about a virtual rotation axis defined outside said retention device, while said drum rotates between said removal position and said release position, and
deactivating said retention elements by disengaging said blank from said retention device while said drum is in said release position.

13. The process according to the claim 12, further comprising:
retaining i) an abutment panel of said blank by said first gripping portion and ii) a lateral panel of said blank by said second gripping portion, in such a manner that said lateral panel is downstream with respect to said abutment panel in accordance with said rotation direction of said drum.

14. The process according to claim 13, further comprising:

while said drum rotates between said removal position and said release position, folding said blank between said abutment panel and said lateral panel by said retention device.

15. The process according to claim 12, further comprising:

rotating a first drum of said movement unit retaining said blank towards said release position, rotating a second drum of said movement unit synchronously with said first drum and with an opposite rotation direction, facing said second gripping portion of a first said retention device secured to said first drum with a second gripping portion of a second said retention device secured to said second drum, facing said first gripping portion of said first retention device with a first gripping portion of said second retention device, maintaining said retention elements of said first retention device activated while the retention elements of said second retention device are also activated, and deactivating said retention elements of said first retention device while said retention elements of said second retention device are kept active.

16. A packing apparatus for articles, comprising at least one blank movement unit, said blank movement unit being the movement unit of claim 8.

* * * * *